US011694181B2

(12) United States Patent
Tseretopoulos et al.

(10) Patent No.: US 11,694,181 B2
(45) Date of Patent: *Jul. 4, 2023

(54) AUTOMATIC DIGITAL PERSONAL ASSISTANT INTERJECTION FOR DELAYING DATA EXCHANGE OUTCOMES

(71) Applicant: The Toronto-Dominion Bank, Toronto (CA)

(72) Inventors: Dean C. N. Tseretopoulos, Toronto (CA); Robert Alexander McCarter, Ontario (CA); Sarabjit Singh Walia, Demarest, NJ (US); Vipul Kishore Lalka, Oakville (CA); Nadia Moretti, Toronto (CA); Paige Elyse Dickie, Toronto (CA); Denny Devasia Kuruvilla, Toronto (CA); Milos Dunjic, Oakville (CA); Dino Paul D'Agostino, Richmond Hill (CA); Arun Victor Jagga, Toronto (CA); John Jong-Suk Lee, Toronto (CA); Rakesh Thomas Jethwa, Toronto (CA)

(73) Assignee: The Toronto-Dominion Bank

( * ) Notice: Subject to any disclaimer, the term of this patent is extended or adjusted under 35 U.S.C. 154(b) by 302 days.

This patent is subject to a terminal disclaimer.

(21) Appl. No.: 16/923,812

(22) Filed: Jul. 8, 2020

(65) Prior Publication Data
US 2020/0342437 A1    Oct. 29, 2020

Related U.S. Application Data

(63) Continuation of application No. 15/723,941, filed on Oct. 3, 2017, now Pat. No. 10,748,131.

(51) Int. Cl.
*G06Q 20/32* (2012.01)
*G06Q 20/12* (2012.01)
(Continued)

(52) U.S. Cl.
CPC ......... *G06Q 20/3223* (2013.01); *G06Q 20/10* (2013.01); *G06Q 20/12* (2013.01); *G06Q 20/326* (2020.05); *G06Q 20/405* (2013.01)

(58) Field of Classification Search
USPC .......................................................... 705/44
See application file for complete search history.

(56) References Cited

U.S. PATENT DOCUMENTS

| 8,751,386 B2 | 6/2014 | Schryer et al. |
| 10,748,131 B2 | 8/2020 | Tseretopoulos et al. |

(Continued)

FOREIGN PATENT DOCUMENTS

CN    106997559 A  *  8/2017

OTHER PUBLICATIONS

Authors: Goel, S. et al.; Title: An adaptable constrained locking protocol for high data contention environments; Publication Date: Jan. 1, 1999; Conference Date: Apr. 21, 1999 (Year: 1999).*

(Continued)

*Primary Examiner* — Bruce I Ebersman
*Assistant Examiner* — Hatem M Ali
(74) *Attorney, Agent, or Firm* — Fish & Richardson P.C.

(57) ABSTRACT

The present disclosure involves systems, software, and computer implemented methods for intercepting data exchange requests and automatically imposing a hold period while the data exchange is evaluated for a user profile initiating the request. One example system includes operations to detect a data exchange request prior to completion of the attempted data exchange, the data exchange request including information defining the attempted data exchange and associated wherein the attempted data exchange is associated with a particular user profile. A portion of the information is transmitted to a data exchange analysis system for execution of a user profile-specific data exchange (Continued)

analysis based on the information and a status of the user profile. A hold state is initiated for the data exchange request while the analysis is performed. The results of the analysis are presented and a confirmation to proceed is required before allowing the attempted data exchange to be processed.

19 Claims, 6 Drawing Sheets

(51) Int. Cl.
  *G06Q 20/40* (2012.01)
  *G06Q 20/10* (2012.01)

(56) References Cited

U.S. PATENT DOCUMENTS

| | | | |
|---|---|---|---|
| 2007/0106558 A1 | 5/2007 | Mitchell et al. | |
| 2008/0140569 A1 | 6/2008 | Handel | |
| 2012/0296768 A1 | 11/2012 | Fremont-Smith et al. | |
| 2013/0191213 A1* | 7/2013 | Beck | G06Q 30/0207 705/14.64 |
| 2014/0289033 A1* | 9/2014 | Ortigoza | G06Q 50/01 705/14.27 |
| 2015/0358657 A1 | 12/2015 | Duffield | |
| 2016/0247233 A1 | 8/2016 | Page | |
| 2019/0102769 A1 | 4/2019 | Tseretopoulos et al. | |

OTHER PUBLICATIONS

Chen et al., "Analysis of multiple shared channel cooperative routing in OFDM based wireless networks." IET International Communication Conference on Wireless Mobile and Computing, Nov. 2011, 175-180.

Fuciu et al., "Internet and E-commerce-tools for creating value in the E-marketplace." The Proceedings of the International Conference "Marketing-from Information to Decision", Babes Bolyai University, Oct. 2011, 129-140.

Liu et al., "Universal access authentication for wireless network." 4th IET International Conference on Wireless, Mobile & Multimedia Networks, Nov. 2011, 350-355.

Soman et al., "Debiasing or rebiasing? Moderating the Illusion of Delayed Incentives," Journal of Economic Psychology, Published in 2011, 307-316.

Soman, "The Illusion of Delayed Incentives: Evaluating Future Effort-Money Transactions," Journal of Marketing Research, vol. 35., No. 4, Preview, Nov. 1998, 2 pages.

CA Office Action issued in Canadian Application No. 2,981,380, dated Sep. 13, 2021, 3 pages.

Office Action in Canadian Appln No. 2,981,380, dated Sep. 13, 2022, 4 pages.

* cited by examiner

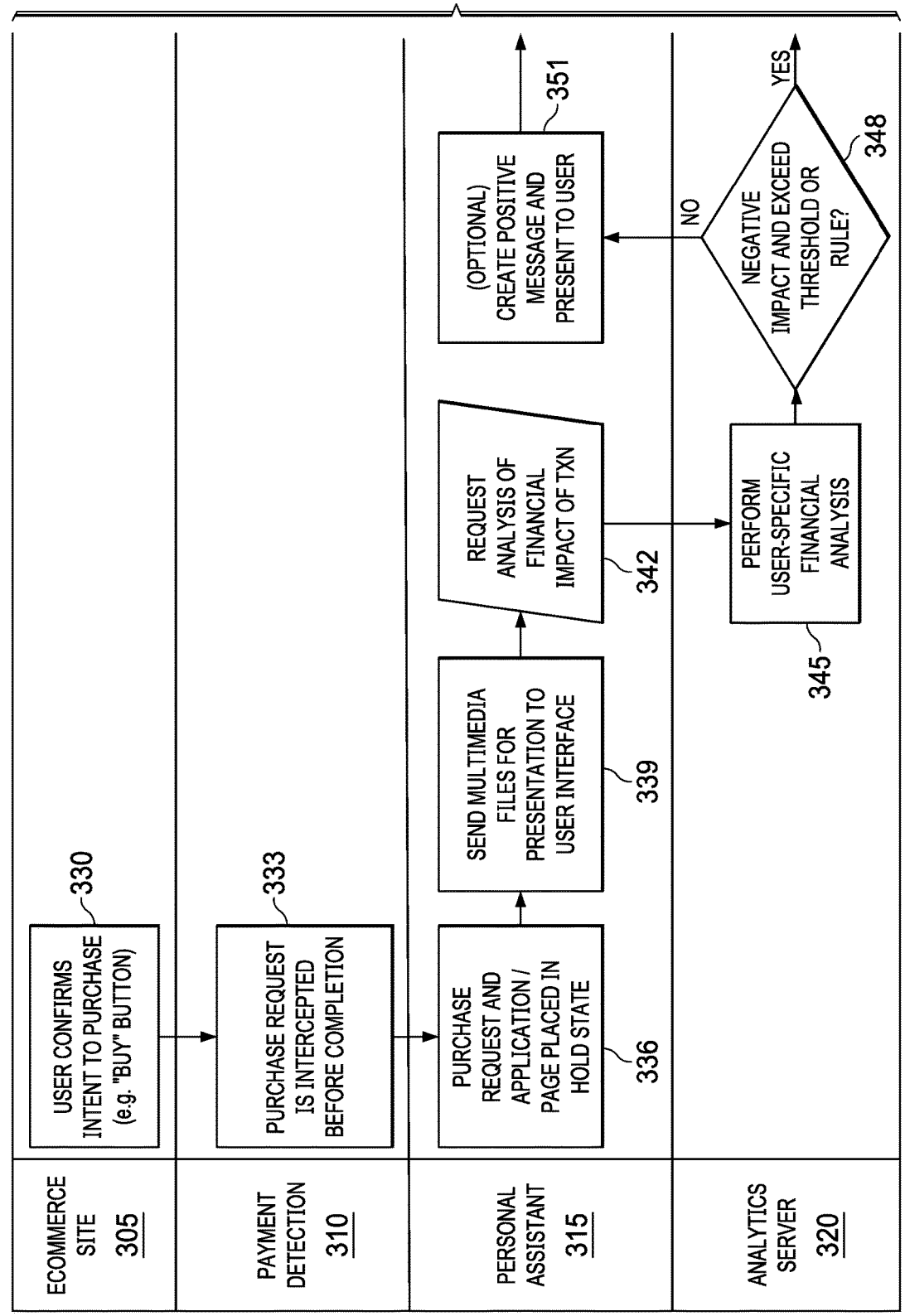

AUTOMATIC DIGITAL PERSONAL ASSISTANT INTERJECTION FOR DELAYING DATA EXCHANGE OUTCOMES

CROSS-REFERENCE TO RELATED PATENT APPLICATIONS

This application is a continuation of and claims the benefit of priority to U.S. patent application Ser. No. 15/723,941, filed Oct. 3, 2017, the contents of which are incorporated by reference herein.

TECHNICAL FIELD

The present disclosure relates to computer-implemented methods, software, and systems for intercepting data exchange requests and automatically imposing a hold period into the attempted data exchange while the data exchange is evaluated for a user profile initiating the request.

BACKGROUND

Digital personal assistants such as Apple's Siri, Google's Assistant, Amazon's Alexa, Microsoft's Cortana, and others provide solutions for performing tasks or services associated with an individual. Such digital personal assistants can be used to request and perform various data exchanges, including transactions, social media interactions, search engine queries, and others. Additionally, similar functionality can be incorporated into web browsers and dedicated applications.

Transactions performed by mobile devices, as well as non-mobile devices can be performed nearly immediately in response to user input when connected to a fast cellular or Wi-Fi network. When the user input is through a digital personal assistant, such input may be verbal without the need to review a screen or graphical user interface (GUI) before completing the transaction.

SUMMARY

The present disclosure involves systems, software, and computer implemented methods for performing data exchange splitting. One example system includes a communications module, a display, at least one memory storing instructions, and at least one hardware processor interoperably coupled with the at least one memory, the display, and the communications module. The instructions can instruct the at least one hardware processor to perform various operations, including detecting a particular data exchange request associated with an attempted data exchange prior to completion of the attempted data exchange. The particular data exchange request can include a set of information defining the attempted data exchange, and the attempted data exchange can be associated with a particular user profile. A first signal including at least a portion of the set of information defining the attempted data exchange can be transmitted, via the communications module, to a data exchange analysis system for execution of a user profile-specific data exchange analysis based on the set of information defining the attempted data exchange and a status of the particular user profile. Additionally, a hold state associated with the particular data exchange request can be initiated prior to completion of the attempted data exchange, where the hold state is initiated in response to detecting the particular data exchange request. The hold state can be maintained for at least a period of time until after a result associated with the user profile-specific data exchange analysis is received. A second signal including a result associated with the user profile-specific data exchange analysis can be received via the communications module. In response to receiving the result, the instructions can cause the at least one hardware processor to display on the display in an interface a request for confirmation to proceed with the particular data exchange request. In response to receiving input associated with the confirmation to proceed, a third signal including the particular data exchange request can be transmitted via the communications module to a data exchange transaction system for processing of the attempted data exchange.

Implementations can optionally include one or more of the following features.

In some instances, a browser plugin or an agent executing on the client device performs the detection of the particular data exchange request.

In some instances, the client device can comprise a mobile client device, where a mobile application executing on the mobile client device performs the detection of the particular data exchange request.

In some instances, the particular data exchange request comprises a transaction request, the attempted data exchange comprises an attempted purchase transaction, the data exchange analysis system comprises a financial system, and the user profile-specific data exchange analysis comprises a financial analytical analysis of the particular user profile based on the transaction request. In those instances, the set of information defining the attempted purchase transaction can include at least one of an amount of the attempted purchase transaction, a merchant type associated with the attempted purchase transaction, and a set of SKU-level data associated with at least one item included in the attempted purchase transaction. Also in those instances, the hold state can be initiated concurrently with transmission of the first signal.

In some of those instances, initiating the hold state comprises providing for presentation at least one multimedia presentation on a user interface associated with the client device. The at least one multimedia presentation can include at least one of a music file, a video file, an interactive game, or an advertisement.

In some of those instances, the financial analytical analysis of the particular user profile based on the transaction request comprises an analysis of the attempted purchase transaction in a context of the particular user profile. In those instances, the analysis can be a comparison of the attempted purchase transaction against at least one financial rule specific to the particular user profile. In some of those instances, at least one of the financial rules can be a rule identifying a particular amount of spending over a period of time associated with the particular user profile and an effect on the particular amount of spending associated with the attempted purchase transaction.

In some instances, the instructions can further instruct the at least one hardware processor to cancel the particular data exchange request in response to receiving user input associated with a cancellation of the particular data exchange request or in response to receiving no user input associated with the confirmation of the particular data exchange after a predetermined period of time.

In some instances, the hold state is maintained after receiving the second signal including the result associated with the user profile-specific data exchange analysis. In those instances, the request for confirmation to proceed with the particular data exchange request is presented during the hold state, and the hold state is completed in response to receiving user input associated with the confirmation to proceed.

In some instances, initiating the hold state associated with the particular data exchange request comprises receiving, via the communications module, a fourth signal including instructions to initiate the hold state from the data exchange analysis system, where the fourth signal is received after transmission of the first signal, and initiating the hold state in response to receiving the fourth signal.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. Still further, the operations performed may be described as computer implemented software embodied on tangible, non-transitory media that processes and transforms the respective data. Some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 3A-3B (collectively referred to hereinafter as FIG. 3) represent a swim lane diagram illustrating a set of flows during an example instance where a data exchange is intercepted and placed into a hold state in one particular implementation.

DETAILED DESCRIPTION

Figure 1:
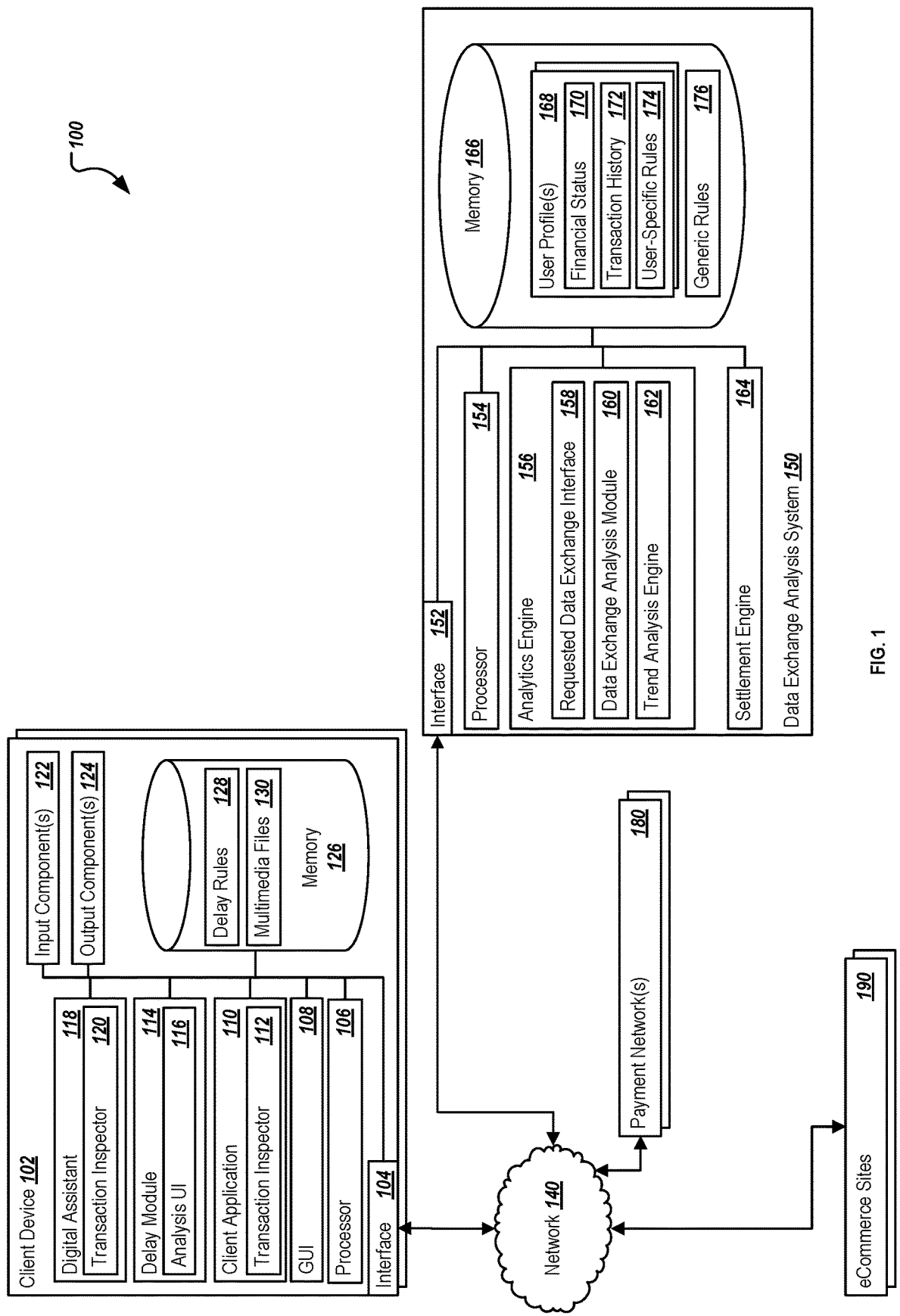
FIG. 1 is a block diagram illustrating an example system for intercepting data exchange requests and automatically imposing a hold period into the attempted data exchange while the data exchange is evaluated for a user profile initiating the request.

The present disclosure describes various tools and techniques associated with intercepting data exchange requests and automatically imposing a hold period into the attempted data exchange while the data exchange is evaluated for a user profile initiating the request. Data exchanges may include, but are not limited to, bill payments, good or service purchases, social network interactions, search queries (e.g., for a particular restaurant, travel arrangements, particular products or services, etc.), and other similar actions. In the present example, the data exchange is described, as an illustrative example, as an attempt to purchase a particular product or combination of products. However, this illustrative example is not meant to be limiting.

When attempting to make purchases, such as through a digital personal assistant such as Apple's Siri, Google's Assistant, Amazon's Alexa, Microsoft's Cortana, users may find it difficult to understand if a particular purchase or other action may have negative financial impacts to their associated accounts (e.g., actual bank accounts, credit cards, loan applications, etc.). For example, a particular purchase, while seemingly innocuous, may cause a credit card bill to rise above a particular threshold (e.g., user-defined) that may cause a credit score impact. Alternatively, paying through a specific funding source may cause a scheduled payment to be short or otherwise unable to be completed as planned, such as a mortgage payment.

Further, as digital transactions are designed to be as fast and painless as possible, users may not have the time or ability to stop a transaction, where no time is given to consider or otherwise assess an impact on their financial situation. Before any change is provided to cancel the transaction, buyer's remorse may have set in. Further, should a later attempt to return or cancel the transaction be made, restocking or other merchant fees may apply, as well as the user having to accept the hassle of physically shipping or returning a product to the merchant. Additionally, merchants may also face additional costs and employee time in performing the restocking or otherwise having to reverse the orders. Financial institutions may also see additional charge backs and other reversals of funds, causing additional issues in returning the item or canceling the service.

Only after the digital transaction has been completed can users evaluate the impact of the transaction, and only then after their respective account and/or user profile has been updated. In prior systems, a user's particular financial condition may not be clear until the end of the month when a new statement arrives on the impact of the action, in light of all other actions, is understandable. This is not useful in preventing potentially harmful data exchanges, as the significant delay in receiving the information does not stop or delay a particular transaction.

In the present solution, a system including an enhanced digital personal assistant and a backend financial analytics component can be combined to intercept attempted transactions prior to their completion, place a hold or delay on the ongoing session or interaction associated with the transaction request at a client device at which the transaction is being attempted, and provide a financial analysis of the particular transaction before completing the attempted transaction. The user may be provided an analysis of the attempted transaction in light of their specific financial state and/or particular predefined or dynamic analysis rules defined by the user or applicable to multiple users. Along with the analysis, the user may be prompted to indicate whether to continue or cancel the attempted transaction before the transaction itself is completed.

Delaying such transactions is used to increase the length of time of the transaction to provide users the ability to consider the action prior to feeling a state of buyer's remorse, while also being able to consider a clear indication of whether the action may have negative financial impacts on their financial health.

When interacting with an eCommerce site or merchant-related application, the digital personal assistant continually executing on the client device can intercept the attempted transaction and cause a delay or hold state to be engaged. For example, in response to an action where the user clicks or otherwise submits a "Buy" or "Purchase" action, the digital personal assistant can indicate or otherwise cause the transactional session to be placed into a "hold state". The hold state can be used to increase the transaction time or cycle from near instantaneous (e.g., a few milliseconds) to 15 to 30 seconds to increase the consideration and potential abandonment of the transaction.

During the delay, one or more multimedia files or content can be presented on or via the client device to place the user in a state of buyer's remorse, or to otherwise enhance or enrich the time of the delay. While the delay or hold state continues, the transaction has not been completed, and the backend financial analytical analysis can be performed prior to presenting the results to the user via the client device and providing the opportunity, in some instances, to allow the user to choose to complete or cancel the transaction.

In some examples, the multimedia files or other content that can be presented while in the hold state or delay can include visual content, audio content or files, vibration alerts, a change in a chatbot or digital personality, feedback associated with the transaction, odor-based files or instructions, or bio-feedback files or instructions, among others. In some instances, the multimedia may be specifically associated with the attempted transaction, or may be provided to discourage the transaction. For example, the visual content may include a stop sign or other visual indication discouraging the transaction from being completed. The audio content may include a clip saying "uh-oh" or other content with negative connotations. The chatbot's personality change may provide a stricter or negative statement, such as "Are you sure you want to buy that!?" In some instances, an initial set of multimedia content can be provided that is relatively neutral to the transaction. In response to the results of the user profile-specific financial analysis, the multimedia files and content may change or be modified to reflect the results of the analysis. For example, a general advertisement may be presented initially. In response to the results being received and indicating a negative impact, new content or files can be presented, either generically having a negative connotation or specifically referencing the negative aspects of the attempted transaction. In some instances, information specific to the reason why a negative result is identified can be presented as or included in the multimedia content. For example, a notification can be presented saying, "Hey, Bob—we notice you have overspent your Dining Out expenses of $50 for this week already. Are you sure you want to place this order?" This notification provides a specific connection to user-specific boundaries that have been predefined and evaluated in light of the proposed transaction. Similar notifications and information can be presented for other types of purchases and data exchanges, and can provide significant insight before any final data exchange decision is made.

In some instances, the digital personal assistant may be associated with a particular application executing on the client device, such as Alexa-related functionality associated with the Amazon mobile app. In other instances, the digital personal assistant may be an extension to a web browser, such as a Google Chrome, Firefox, or Safari, among others. In some instances, the functionality may be built into or part of the functionality of an operating system of the client device, such as Google Assistant in Android-based devices or Apple's Siri. In still other instances, the digital personal assistant may be provided by a financial institution, and can monitor interactions performed on one or more executing applications at the client device.

Turning to the illustrated example implementation, FIG. 1 is a block diagram illustrating an example system 100 for intercepting data exchange requests and automatically imposing a hold period into the attempted data exchange while the data exchange is evaluated for a user profile initiating the request. System 100 includes functionality and structure associated with initiating a new attempted data exchange associated with a particular merchant or data exchange partner, intercepting the attempted data exchange prior to completing the data exchange, and placing the transaction session in a hold state to delay the completion of the attempted data exchange while one or more data exchange analyses are performed. In response to the completed analyses, the user attempting the data exchange can be provided with a real-time analysis of the attempted transaction as it relates to and affects the status of their user profile. Specifically, the illustrated system 100 includes or is communicably coupled with a client device 102, a data exchange analysis system 150, one or more payment networks 180, one or more eCommerce sites 190, and a network 140. System 100 is a single example of a possible implementation, with alternatives, additions, and modifications possible for performing some or all of the described operations and functionality. Although shown separately, in some implementations, functionality of two or more systems, servers, or illustrated components may be provided by a single system or server. In some implementations, the functionality of one illustrated system or server may be provided by multiple systems, servers, or computing devices, including those physically or logically local or remote to each other. Any combination or permutation of systems may perform the functionality described herein. In some instances, particular operations and functionality described herein may be executed at either the client device 102, the data exchange analysis system 150, or at one or more other non-illustrated components, as well as at a combination thereof.

As used in the present disclosure, the term "computer" is intended to encompass any suitable processing device. For example, client device 102, data exchange analysis system 150, and the payment network(s) 180 may be any computer or processing device (or combination of devices) such as, for example, a blade server, general-purpose personal computer (PC), Mac®, workstation, UNIX-based workstation, embedded system or any other suitable device. Moreover, although FIG. 1 illustrates particular components as a single element, those components may be implemented using a single system or more than those illustrated, as well as computers other than servers, including a server pool or variations that include distributed computing. In other words, the present disclosure contemplates computers other than general-purpose computers, as well as computers without conventional operating systems. Client device 102 may be any system which can request data, execute an application, and/or interact with the data exchange analysis system 150. The client device 102, in some instances, may be any other suitable device, including a mobile device, such as a smartphone, a tablet computing device, a smartwatch, a laptop/notebook computer, or any other suitable device. In general, each illustrated component may be adapted to execute any suitable operating system, including Linux, UNIX, Windows, Mac OS®, Java™, Android™, Windows Phone OS, or iOS™, any real-time OS among others.

As illustrated, the client device 102 includes an interface 104, a processor 106, a graphical user interface (GUI) 108, a client application 110, a delay module 114, a digital assistant 118, at least one input component 122, at least one output component 124, and memory 126. In general, the client device 102 may be any device or computer used to interact with one or more eCommerce sites 190, payment networks 180, and the data exchange analysis system 150. While specifically identified as an eCommerce site 190, the eCommerce sites 190 may include any system or platform with which one or more data exchanges can be performed, and can include social networks, messaging applications, merchant websites, shopping systems, service-based ordering systems, investment or insurance-related systems or websites, or any other suitable system. The client device 102 can interact with these various systems to initiate and attempt to perform a particular data exchange, which may include a purchase attempt or other financial interaction that may provide a potential impact on the user profile and any financial accounts associated therewith.

Interface 104 is used by the client device 102 for communicating with other systems in a distributed environment—including within the environment 100—connected to the client device 102 and/or network 140, e.g., data exchange analysis system 150, other client devices 102, payment network(s) 180, and eCommerce sites 190, as well as other systems or components communicably coupled to the network 140. Generally, the interface 104 comprises logic encoded in software and/or hardware in a suitable combination and operable to communicate with the network 140 and other communicably coupled components. More specifically, the interface 104 may comprise software supporting one or more communication protocols associated with communications such that the client device 102, network 140, and/or interface's hardware is operable to communicate physical signals within and outside of the illustrated environment 100.

Network 140 facilitates wireless or wireline communications between the components of the environment 100 (e.g., between combinations of the data exchange analysis system 150, client device(s) 102, and/or the payment network(s) 180, among others) as well as with any other local or remote computer, such as additional mobile devices, clients, servers, remotely executed or located portions of a particular component, or other devices communicably coupled to network 140, including those not illustrated in FIG. 1. In the illustrated environment, the network 140 is depicted as a single network, but may be comprised of more than one network without departing from the scope of this disclosure, so long as at least a portion of the network 140 may facilitate communications between senders and recipients. In some instances, one or more of the illustrated components (e.g., the data exchange analysis system 150) or portions thereof (e.g., the data the analytics engine 156, the settlement engine 164, or other portions) may be included within network 140 as one or more cloud-based services or operations. The network 140 may be all or a portion of an enterprise or secured network, while in another instance, at least a portion of the network 140 may represent a connection to the Internet. In some instances, a portion of the network 140 may be a virtual private network (VPN) or an Intranet. Further, all or a portion of the network 140 can comprise either a wireline or wireless link. Example wireless links may include 802.11a/b/g/n/ac, 802.20, WiMax, LTE, and/or any other appropriate wireless link. In other words, the network 140 encompasses any internal or external network, networks, sub-network, or combination thereof operable to facilitate communications between various computing components inside and outside the illustrated environment 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

Client device 102 also includes one or more processors 106. Although illustrated as a single processor 106 in FIG. 1, multiple processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the client device 102, in particular those related to executing the various modules illustrated therein and their related functionality. Specifically, the processor 106 executes the algorithms and operations described in the illustrated figures, as well as the various software modules and functionalities, including the functionality for sending communications to and receiving transmissions from the eCommerce sites 190, the data exchange analysis system 150, and/or the payment system(s) 180, as well as to other devices and systems. Each processor 106 may have a single core or multiple cores, with each core available to host and execute an individual processing thread.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, Objective-C, JavaScript, Java™, Visual Basic, assembler, Perl®, Swift, HTML5, any suitable version of 4GL, as well as others.

The client device 102 can include one or more client applications, including the client application 110. In some instances, the client device 102 may comprise a device that includes at least one input device or component 122, such as a keypad, touch screen, or other device(s) that can interact with the client application 110 and other functionality or components, and at least one output device or component 124 that conveys information associated with the operation of the applications and their output to the user of the client device 102 (e.g., display(s), speaker(s), etc.). Such information may include digital data, visual information, audible information, or a GUI 108, as shown with respect to the client device 102. In general, client device 102 comprises an electronic computer device operable to receive, transmit, process, and store any appropriate data associated with the environment 100 of FIG. 1. In particular, the client device 102 can be associated with or can initiate one or more data exchanges, which may be associated with the data exchange analysis system 150 and its operations.

Client application 110 can be any type of application that allows the client device 102 to request and view content on the client device 102. In some instances, client application 110 may correspond with one or more backend applications or functionality, including an application or platform associated with the data exchange analysis system 150, or other backend systems, including as a mobile application executing on a mobile device and used to purchase goods or services or otherwise initiate and complete data exchanges. In some instances, the client application 110 may be specifically associated with a particular eCommerce site 190. In other instances, the client application 110 may be a web browser or other application with web browsing capabilities, where the application 110 can be directed to and interact with one or more eCommerce sites 190 to attempt to initiate one or more data exchanges. In some instances, the client application 110 may be an agent or client-side version of the one or more applications or services running on a backend system, such as an agent or client-side version (e.g., mobile application) of the applications and systems using or associated with the data exchange analysis system 150, or with another backend system or platform, including at least one eCommerce site 190.

As illustrated, the client application 110 may include or be associated with a transaction inspector 112. The transaction inspector 112 may be any agent, listener, module, script, interface, or other suitable software that may be used to detect and intercept particular data exchanges attempted to be completed within the client application 112. In some instances, the transaction inspector 112 may be a part of the inherent functionality of the client application 110, or may be a separate component. The transaction inspector 112 may notify, in response to detecting a data exchange attempt, one or more internal or external components are systems. For example, the transaction inspector 112 may notify the delay module 114, the digital assistant 118, and/or the data exchange analysis system 150 of the attempted transaction. The notification may be via an internally or externally transmitted signal, and the notification may include a set of details of the attempted data exchange. Those details may include a set of information regarding the attempted data exchange, including a value or amount of the data exchange, the party or entity with which the data exchange would take place, one or more items or content associated with the data exchange (e.g., particular goods or services, including SKU-level data), basic or detailed classifications or types of the subject of the data exchange, as well as other suitable information. Other information that can be captured can include a time of day, a hazardous material classification associated with a particular item, an identifier associated with an item on a restricted list (e.g., an identifier associated with the item identifying the item as associated with a banned material, a banned country, a banned currency, etc.), or an intended or required age for the product (e.g., for products such as alcohol, tobacco, or firearms, or for toys or devices associated with a recommended age). Any other suitable information about either the user or the transaction itself may be captured. Information about the transaction can include items, services, or data attempted to be included in the data exchange, information identifying the participants in the data exchange, or contextual information about the device or participants. While the transaction inspector 112 is illustrated within the client application 110, additional or alternative transaction inspectors may be available at, included in, or otherwise associated with other components, where appropriate. For example, another transaction inspector 120 is illustrated within the digital assistant 118, and may be used instead of or in addition to transaction inspector 112.

Delay module 114 of the client device 102 operates to initiate and maintain a hold state or other delay in response to a detected attempted data exchange. The delay module 114 may be capable of pausing or otherwise holding the transaction state and ensuring that the data exchange request is not completed or transmitted to the eCommerce site 190 with which the client application 110 is using to perform the attempted data exchange. The delay module 114 can be associated with a plurality of delay rules 128, where the delay rules 128 determine how the delays and hold states are to be implemented. In some instances, the delay module 114 may also store the intercepted data exchange request. Should the data exchange be determined to be completed after further processing, the delay module 114 (or the client application 110) can use the stored data exchange request information and transmit it to the corresponding eCommerce site 190. The delay module 114 can be used to manage, during any hold states, the presentation of one or more multimedia files 130 or similar content to a display or other output component 124 associated with the client device 102. The multimedia files 130 may be any suitable format or type, and can be used to present material to the user during any initiated hold states. In one example, visual, video, or audio media may be presented to or provided to the user via the output component 124 (e.g., the display or speakers of the client device 102). The multimedia files 130 can be generic media files, or they may be specifically tailored to the interaction of the user. In some instances, the multimedia files 130 presented can correspond to the data exchange analysis performed by the data exchange analysis system 150. For example, text provided to the user may reflect or describe a negative impact the attempted data exchange may have on one or more aspects of the user profile of the user, such as a particular account or score (e.g., on the financial health or fitness of the user). In others, a voice may be provided with a recommendation not to proceed with the data exchange, or providing a consideration identified during the data exchange analysis that should be considered by the user prior to confirming the data exchange should be completed. In some instances, a first delay-related multimedia file 130 may be presented initially while the data exchange analysis is being performed, with a second result-related file 130 or other output being provided in response to the analysis being completed and returned to the client device 102. In some instances, those different files 130 or output may be different types of output, such as an initial video played at the beginning of the hold state and a textual or audible output provided once the result is returned. Any suitable multimedia files 130 can be used, where the identification and order of the particular files 130 to be presented determined by the delay rules 128.

The delay module 114 can include an analysis UI 116, which may be associated with the presentation of the analysis results received from the data exchange analysis system 150. The analysis UI 116 can provide one or more interactive or information screens, presentations, or interactions to the user via an output component 124 of the client device 102. In some instances, a popup or other interactive prompt may be provided by the analysis UI 116 in connection with or after a presentation of the results of the data exchange analysis. The prompt may request the user to indicate whether to continue with the attempted data exchange or to cancel the attempted data exchange. Once a response or indication is received via an input component 122, the delay module 114 can end the hold state and process the indication accordingly, either by continuing the data exchange, or by canceling the data exchange or otherwise allowing it to time out. In some instances, at least a portion of the delay module 114 may be operated or controlled by the digital assistant 118 or the client application 110. In some instances, the analysis UI 116 and/or the delay module 114 may stream or otherwise obtain content stored remotely from the client device 102.

The digital assistant 118 may be any interactive artificial or virtual intelligence component, agent, or other functionality that can be interacted with by a user, either verbally through one or more input components 122 (e.g., a microphone), manually through one or more input components 122 (e.g., physical or virtual keyboards, touch screen buttons or controls, other physical or virtual buttons, etc.), or through captured gestures or movements identified by the client device 102. In general, the digital assistant 118 may be a software agent, module, or component, among others, that can perform tasks or services for an individual in response to one or more inputs. As indicated, any one of numerous commercial examples may be used, as well as other proprietary or application-specific assistants. The digital assistant 118 may work and interact via text (e.g., chat), voice, image submission, or other suitable inputs. Some virtual assistants can interpret input using natural language processing (NLP) to match user text or voice input to executable commands. In some instances, the digital assistant 118 can be interacted with to initiate and perform one or more data exchanges. In some instances, the digital assistant 118 may be a standalone application (e.g., Google Assistant executing on an iPhone), functionality included in a particular application used for other purposes (e.g., an Alexa-enabled Amazon app), or an agent or other functionality built into the operating system (e.g., Siri on Apple's iOS). In some instances, the digital assistant 118 may be able to monitor operations of one or more client applications 110 as those applications execute, even when the digital assistant 118 is not specifically being interacted with by the user. In those instances, the digital assistant 118 may be used to intercept particular data exchange attempts (e.g., via transaction inspector 120), and can be used to present some of the delay module's multimedia files 130 and/or other content. In still other instances, the attempted data exchange may be initiated or may be attempted to be initiated via interactions with the digital assistant 118.

As illustrated, client device 102 includes memory 126. In some implementations, the client device 102 includes a single memory or multiple memories. The memory 126 may include any type of memory or database module and may take the form of volatile and/or non-volatile memory including, without limitation, magnetic media, optical media, random access memory (RAM), read-only memory (ROM), removable media, or any other suitable local or remote memory component. The memory 126 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the client device 102. Additionally, the memory 126 may store any other appropriate data, such as VPN applications, firmware logs and policies, firewall policies, a security or access log, print or other reporting files, as well as others. As illustrated, memory 126 includes, for example, the delay rules 128 and multimedia files 130 described above. Memory 126 may be local to or remote to the client device 102, and may be available remotely via network 140 or an alternative connection in such instances where not locally available. Further, some or all of the data included in memory 126 in FIG. 1 may be located outside of the client device 102, including within network 140 as cloud-based storage and data.

GUI 108 can interface with at least a portion of the environment 100 for any suitable purpose, including generating a visual representation of the client application 110 or digital assistant 118, presenting a pop-up or push notification or preview thereof, or any other suitable presentation of information, including the interactive visualizations related to the data exchange process. GUI 108 may also be used to view and interact with various Web pages, applications, and Web services located local or external to the client device 102, as well as information relevant to the client application 110 and any received notifications and communications sent from the data exchange analysis system 150. Generally, the GUI 108 provides the user with an efficient and user-friendly presentation of data provided by or communicated within the system. The GUI 108 may comprise a plurality of customizable frames or views having interactive fields, pull-down lists, and buttons operated by the user. For example, the GUI 108 may provide interactive elements that allow a user to view or interact with information related to the operations of processes associated with the client device 102 and any associated systems, including those associated with or connected to the data exchange analysis system 150, among others. In general, the GUI 108 is often configurable, supports a combination of tables and graphs (bar, line, pie, status dials, etc.), and is able to build real-time portals, application windows, and presentations. Therefore, the GUI 108 contemplates any suitable graphical user interface, such as a combination of a generic web browser, a web-enabled application, intelligent engine, and command line interface (CLI) that processes information in the platform and efficiently presents the results to the user visually.

The data exchange analysis system 150 may be any system or component at which a user profile-specific analysis of a particular attempted data exchange can be evaluated based on the attempted data exchange itself, one or more analysis rules, and current and historical status information associated with the particular user profile of the user associated with the attempted data exchange. As illustrated, the data exchange analysis system 150 includes an interface 152, a processor 154, an analytics engine 156, a settlement engine 164, and memory 166. The interface 152 and processor 154 may be similar to or different from interface 104 and processor 106 described in relation to client device 102.

The analytics engine 156 may be any analytical system capable of receiving information associated with an attempted data exchange and a particular user profile associated therewith, and applying or executing a user profile-specific analysis to determine whether the attempted data exchange represents a positive or negative action in connection with the user profile and/or one or more accounts associated therewith. In some instances, the analytics engine 156 may be associated with a financial system or institution, where the analysis is performed on intercepted purchase or other financial transactions as described herein. Once the data exchange analysis is performed, the analytics engine 156 can provide that information back to the client device 102 via the digital assistant 118, the delay module 114, and/or the client application 110.

As illustrated, the analytics engine 156 includes a requested data exchange interface 158. The interface 158 may be associated with a particular address, application programming interface (API), or other endpoint (e.g., uniform resource locator (URL), uniform resource identifier (URI), etc.) to receive incoming requests for particular data exchange analyses. Incoming requests may identify the user profile associated with the attempted transaction, information about the transaction such as a value, type of transaction, and particular items or subject matter of the transaction, and any other suitable information. In response to complete analyses, the interface 158 may initiate the responsive indication of the analysis results and/or particular comments or recommendations associated therewith.

The data exchange analysis module 160 of the analytics engine 156 can use information associated with the particular user profile and attempted data exchange to determine the positive or negative affect on the user and the user profile. Memory 166 (which may be similar to or different than memory 126) of the data exchange analysis system 150 can include a plurality of user profiles 168, where specific information about the individual user profiles 168 can be found and used in the analysis. A current financial status 170 may be associated with each user profile 168, and can include information about one or more user accounts or information identifying how such information can be obtained, such as from particular data sources or providers. Additionally, a transaction history 172 for the particular user profile 168 may be available, including information identifying common data exchange habits, upcoming or scheduled data exchanges, expected data exchanges occurring in the future but not yet scheduled, and previously performed data exchanges. This information can then be used, in part, to determine whether the attempted data exchange may provide a positive or negative impact for the user profile 168. Further, one or more user profile-specific rules 174 may be associated with the user profile 168. In some instances, at least some of the rules may be specifically defined by the user as parameters for an analysis of particular data exchanges (e.g., a rule providing a budget for dining out over a predetermined period of time). Specific types of data exchanges may be associated with different rule sets, or an overall spending or outlay may be associated with a particular rule. Other rules may be dynamically determined and derived without specific user definition based on historical and/or trend-based analyses (e.g., as performed by the trend analysis engine 162). Those rules can be automatically modified over time as new and additional data exchanges are performed. Such rules may identify when particular data exchanges occur, a value associated with those data exchanges, and other similar information. Such information can be used to provide an understanding of the needs or expected actions of the user profile 168, where those needs or expected actions are used to evaluate the effect of the particular attempted data exchange. In some instances, one or more generic or other non-user profile-specific rules 176 may be considered and used by the analytics engine 156 to perform the analysis. The non-user profile specific rules 176 may include generic rule sets or other considerations applicable to multiple or all users. For example, one generic rule 176 may identify a frequency of data exchanges within a period of time or exceeding a particular amount. When the frequency or amount associated with the rule 176 is exceeded, the rule may be triggered.

The settlement engine 164 may be related to one or more completed data exchanges identified as completed in response to the user continuing the attempted data exchange after the analysis is performed. In those instances, the settlement engine 164 may pass on or update information associated with the user profile 168 based on the completed data exchanges. Similarly, the trend analysis engine 162 may update one or more user-specific rules 174, where appropriate. The settlement engine 164 may be associated with a financial system, where accounts associated with that financial system or institution are updated based on the settlement information received at or by the engine 164.

In alternative implementations, information about attempted data exchanges may first be provided to a financial institution or other appropriate system. That system can then forward or provide information regarding the attempted data exchange to the data exchange analysis system 150. The results of the analysis can then be provided back to the financial institution or other system, where those results can be provided back to the client device 102 as appropriate.

Payment network(s) 180 may be used to assist in facilitation of one or more payments associated with a data exchange or assist in facilitating the data exchange, where appropriate. The payment network(s) 180 may be a system, server, or other computing device associated with a particular entity, business, platform, or computing system with which financial operations can be performed. In some instances, the payment networks 180 may be associated with a particular financial institution, while in others, the payment systems 180 may be associated with a particular payment system or platform (e.g., Visa, MasterCard, PayPal, etc.). Using the functionality described herein, the attempted data exchange may only reach the payment network(s) 180 after confirmation from the user that a particular data exchange should be continued after the hold state has been enacted and the results of the data exchange analysis returned. If the user elects to cancel the data exchange during the hold state, or the data exchange times out while waiting for the confirmation of continuation, then the payment network(s) 180 may not be notified of the attempted data exchange.

While portions of the elements illustrated in FIG. 1 are shown as individual components, systems, and modules that implement the various features and functionality through various objects, methods, or other processes, the various components and software may instead include a number of sub-modules, third-party services, components, libraries, and such, as appropriate. Conversely, the features and functionality of various components can be combined into single components as appropriate.

Figure 2A:
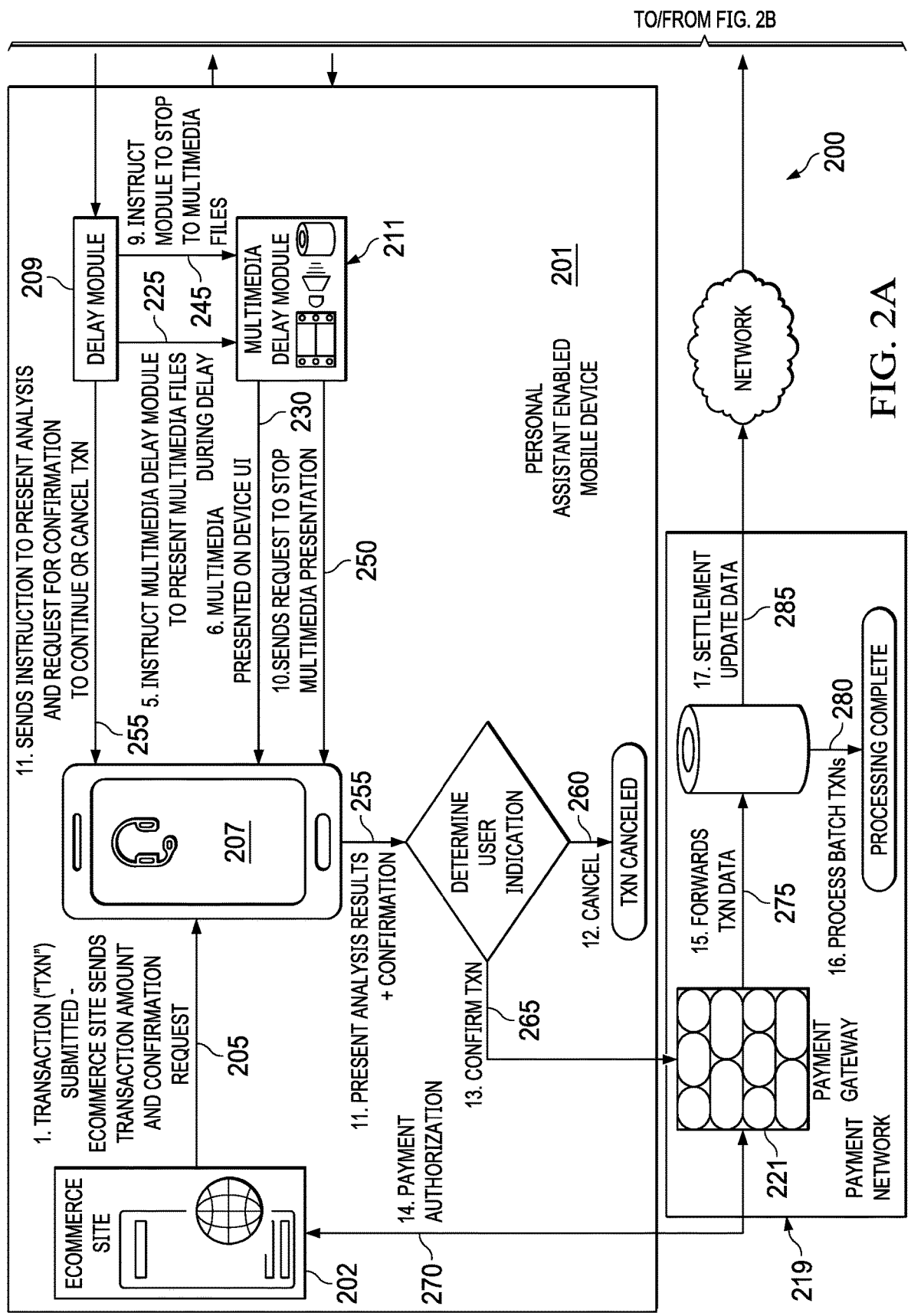
FIG. 2A-2B (collectively referred to hereinafter as FIG. 2) represent a data and control flow of example interactions performed by a system performing operations associated with intercepting data exchange requests and automatically imposing a hold period into the attempted data exchange while the data exchange is evaluated for a user profile initiating the request.
Figure 2B:
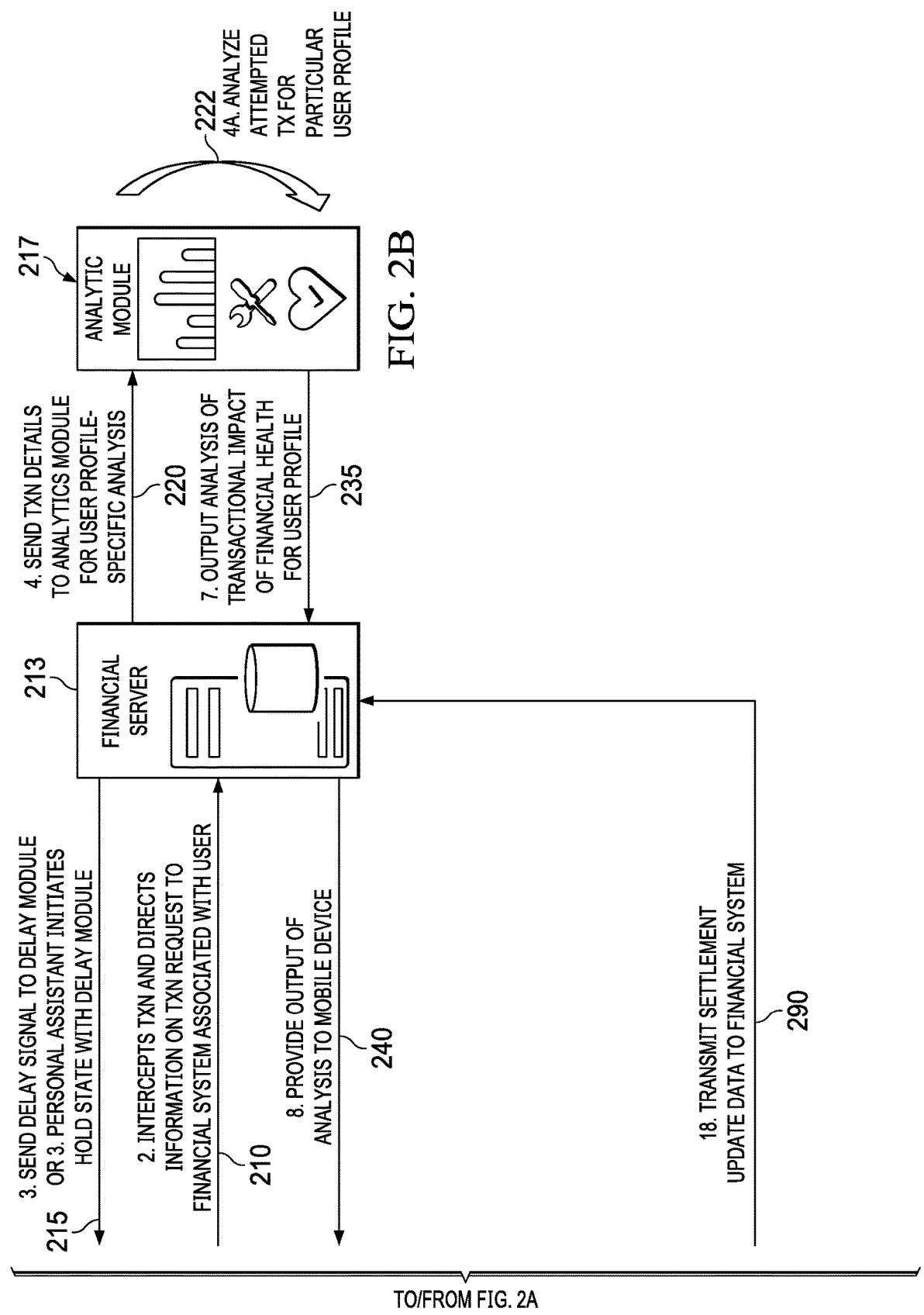

FIG. 2 is a data and control flow of example interactions performed by a system performing operations associated with intercepting data exchange requests and automatically imposing a hold period into the attempted data exchange while the data exchange is evaluated for a user profile initiating the request. FIG. 2 may be described in terms similar to or the same as those illustrated in FIG. 1, although any suitable system or set of components may be used to implement the illustrated components of FIG. 2, where appropriate.

As illustrated, flow 200 involves a personal assistant enabled mobile device 201, a financial server 213, an analytics module 217, and a payment network 219. The mobile device 201 may be a smartphone, tablet, or smartwatch, as well as a connected device including or executing a personal assistant. In the present example, the mobile device 201 is interacting with an eCommerce site 202, where at least one transaction is being considered by the user. At 205, a transaction is attempted via the eCommerce site 202, such as through a manual command or input provided by the user on the mobile device or a verbal or other suitable command entered or input via the executing personal assistant. In response to the submitted transaction, the transaction amount and a confirmation request are submitted by the eCommerce site 202, similar to traditional or standard interactions. At 210, the attempted transaction is intercepted by the personal assistant or another similar component, and information associated with the attempted transaction request (e.g., parties involved, amounts, types or specific goods/services associated with the transaction) can be provided to a financial system associated with the user along with a user identifier.

The financial server 213 at which the intercepted transaction information is received can be associated with a particular financial institution, a third-party financial tool or analysis system, or any suitable component at which financial information associated with the user is maintained or evaluated. Although shown separate from the analytics module 217, the financial server 213 may include or otherwise be associated with the analytics module 217 in other implementations.

As illustrated by 215, the financial server 213 may transmit a signal to a delay module 209 associated with the mobile device 201 including instructions to place the current transaction into a delay or hold state. In other instances, the personal assistant may determine that the hold state should be implemented and provide such an instruction to the delay module 209, as appropriate. In any instance, the delay state can be implemented using the delay module 209, which may be part of the personal assistant or a separate component, where the delay module 209 manages and monitors when and how hold states are implemented.

As illustrated by 220, the financial server 213 can provide the transaction details to the analytics module 217 to perform a user profile-specific analysis on the particular transaction in light of the current or future financial status of the user. The analytics module, at 222, can use information associated with the user (e.g., a user profile), including historical transaction information, pending or upcoming transactions, and user-specific goals or rules to determine whether the impact of the attempted transaction will be positive or negative for the financial health of the user.

While the analysis is being performed, the delay module 209 can instruct or cause a multimedia delay module 211 (which may be a part of the delay module 209) to present one or more multimedia files or content via an output component of the mobile device 201 (225). In some instances, the multimedia files may be located or stored locally at the mobile device 201, while in others, the files may be streamed or otherwise obtained from a remote location or source. The content presented at the mobile device may be a visual display presented via a user interface, an audio file presented via one or more speakers, an advertisement, an interactive game or communication, or any other suitable action or activity. The multimedia delay module 211 can send instructions or content to the device UI 207 or other output components at 230, where the multimedia content can be presented. In some instances, an initial portion of the hold state managed by the delay module 209 may be associated with a first set of multimedia content. Once the results of the transaction analysis are available, the delay module 209 may be able to present a second set of multimedia content, potentially via a second type of multimedia content. In some instances, the first set of multimedia content may be modified or otherwise supplemented in response to receiving the results, and can include a presentation associated with those results. For example, if a positive impact is determined from the analysis, a positive textual message or audio file may be presented. Alternatively, if a negative impact is determined, a textual message, audio file, or other output can be presented in such a manner to attempt to discourage the transaction from being completed.

At 235, once the analysis is complete, the analytics module 217 can provide the output of the transaction impact analysis to the financial server 213. The financial server 213 can then transmit a signal to the mobile device 201 (e.g., via the personal assistant, delay module 209, or other suitable component) including the output and results of the analysis at 240. In response to the results being received, the presentation managed by the delay module 209 and the multimedia delay module 211 can be paused, ended, or supplemented. In some instances, and as noted above, the presentation can be supplemented or augmented with information associated with the results. In other instances, the presentation may be ended or paused while those results are presented. In the illustrated example, at 245, instructions can be provided by the delay module 209 to stop or pause the multimedia presentation. In response, the multimedia delay module 211 can send instructions to stop the presentation to the device UI 207, or can otherwise stop presenting the multimedia content at 250.

At 255, the results of the analysis and a request for confirmation can be presented at the device UI 207. In some instances, the results may be presented visually, while in others, the results may be presented verbally. Along with the presentation of the results, as well as any particular messaging or recommendations, a request for confirmation can be presented at 255. A determination of user input and/or indications, via touch input, verbal input, keyboard input, or simply inaction can be made. If the user input or indication is associated with a cancellation of the attempted transaction, then at 260 the attempted transaction can be canceled. The cancellation may be made via explicit action associated with the confirmation request (e.g., a verbal statement of "Cancel" or pressing of a virtual button labeled "Cancel Transaction") or a period of inaction in response to the confirmation request.

If, however, confirmation is received from the user to continue the transaction, at 265 the transaction is removed from the hold state initiated by the delay module 209 and is confirmed. Transaction details required to complete the purchase or other operation are provided to payment network 219 via payment gateway 221. The payment authorization is then sent (270) to the eCommerce site 202 with the information about the purchase and payment, such that the eCommerce site 202 can finalize the requested transaction.

The payment gateway 221 can perform the standard operations for processing the payment, including forwarding the transaction data 275 to a local or remote location or queue for later batch processing of transactions (280), along with sending settlement data (285) to a network, which in turn provides the updated settlement information to the financial system 213 associated with the user at 290. The financial server 213 can use this updated settlement data to update one or more accounts associated with the user profile of the user, and can update the current financial status and/or analytic considerations based on the changes caused by the new completed transaction so that future analytical determinations use up-to-date account and user profile information.

It is noted and will be understood to persons of skill in the art that the operations and flows of FIG. 2 may be modified, altered, expanded, or performed in different manners or in different orders where appropriate, and are not meant to be limiting to the particular illustrated implementation.

Figure 3B:
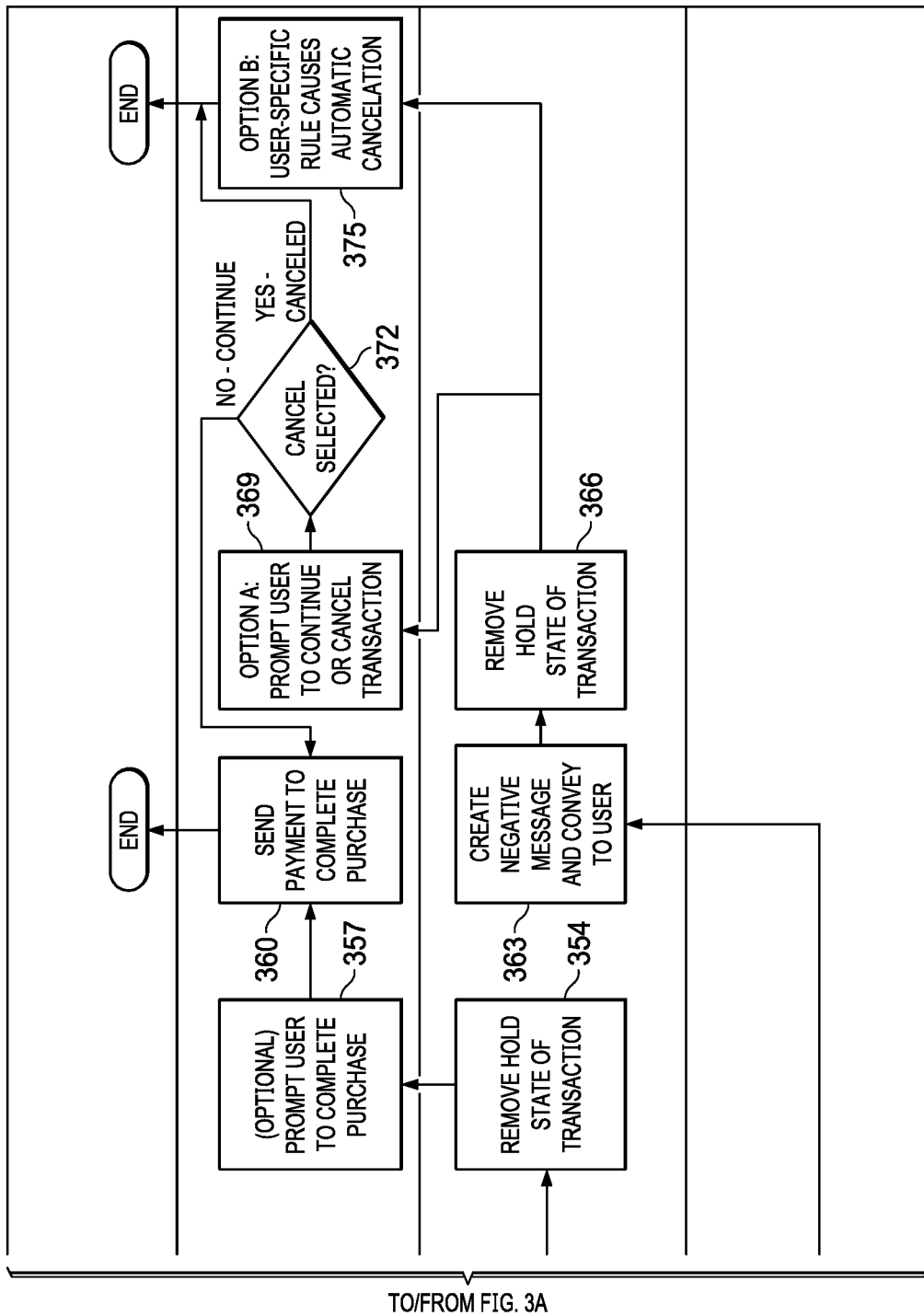

FIG. 3 is a swim lane diagram illustrating a set of actions 300 during an example instance where a data exchange is intercepted and placed into a hold state in one particular implementation. As illustrated, the example actions 300 of FIG. 3 are performed by an eCommerce site 305, a payment detection module 310, a personal assistant 315 executing on a client device, and an analytics server 320. The payment detection module 310 may be included functionality of the personal assistant 315, an agent thereof, or any suitable component, agent, daemon, or extension, among others, that can identify and detect transaction requests made in and associated with the eCommerce site 305. In some instances, the payment detection module 310 may be part of a client application (such as client application 110 of FIG. 1) that manages interactions with the eCommerce site 305 as transactions and data exchanges are requested and performed. In the present illustration, the payment detection module 310 can intercept attempted transactions and provide control or associated data to the personal assistant 315, where the personal assistant 315 can manage a delay or hold state with the transaction as the analysis is performed. The payment detection module 310 can then present or interact with a user of the client device to receive instructions and inputs associated with continuing or canceling particular transactions based on the analytical determination. It is noted that the analytics server 320 can be part of a larger financial system (not shown here) that manages or monitors one or more accounts associated with a user profile of the user associated with the attempted transaction.

Beginning at 330, a user of the client device confirms, via actions and input provided via the client device, an intent to purchase or engage in a particular transaction. As an example, the user may select one or more items or services and activate a "Buy" button within a UI associated with the eCommerce site.

In current solutions, such a user action would initiate and allow the purchase of the items or services without further operations. In the present set of actions 300, however, the payment detection module 310 can intercept the purchase request prior to completion at 333. In connection with the interception, the information associated with the purchase request is provided to a personal assistant 315 executing at least partially on the client device. The personal assistant 315 may be functionality provided with the operating system of the client device, or may be a separately installed component.

In response to receiving the purchase request, at 336 the personal assistant 315 can place the application associated with the purchase attempt and/or the web page-based transaction in a hold state prior to allowing the purchase request to be completed. As described in FIGS. 1 and 2, a specific delay module managed or triggered by the personal assistant 315 may be used to initiate the delay or hold state. In some instances, the personal assistant 315 may initially forward information about the attempted transaction to the analytics server 320 or another financial server, and may receive a signal including instructions to initiate the hold state. At 339, the personal assistant 315 (or a component thereof or associated therewith) can send one or more multimedia files for presentation to a UI of the client device. Those multimedia presentations can be presented in connection with the hold state, and may be generic to the user or specifically tailored to the user. The presentations can include informational presentations, video presentations, advertisements, entertainment (including interactive entertainment), or other suitable content. The content may be stored local to the client device or may be streamed content from a remote source.

At 342, the personal assistant 315 can transmit a request for an analysis of the financial impact of the transaction. In some instances, the request may be explicit, while in others, the request may be implicit, such as by notifying a financial system about the attempted transaction, the analytics request can be initiated by the financial system. Requesting the analysis can include sending details about the attempted transaction to a financial system or the analytics server 320, the details including, for example, an amount of the attempted transaction, the user or an identifier of the user associated with the request, and the goods or services included in the transaction or the types thereof (including SKU data, where available), among others. In some instances, the information may be obtained from the transaction request, while in others, the personal assistant 315 or the payment detection module 310 may review or analyze the eCommerce site page or application associated with the transaction to obtain the data regarding the transaction, such as particular items or goods. Screen scraping, screenshots, and other suitable techniques may be used, as needed.

At 345, in response to the request for the analysis, the analytics server 320 receives the transaction information and performs a user-specific financial analysis as described previously. Any suitable analysis can be used, and the user profile of the user associated with the attempted transaction, as well as any information related to the user, including financial accounts, expected future transactions, and user-specific transaction analysis rules or considerations, can be applied to determine the potential or likely impact on the financial situation of the user. At 348, a determination is made by the analytics server 320 whether the impact of the attempted transaction is a negative one. In some instances, a relative negativity can be determined, where the potential impact is measured against one or more negative thresholds. Any suitable negative threshold can be used, such as a particular debt amount being exceeded, a budgeted amount for particular types of transactions being exceeded, a particular amount remaining within a particular account being below a threshold value after the attempted transaction, among others.

In response to a determination that the attempted transaction does not have a negative impact exceeded a threshold or meeting a particular rule, actions 300 can continue at 351. At 351, a positive message or notification can be generated and presented to the user via any particular output on the client device. In some instances, no positive message may be generated, and the hold state may be removed or ended (at 354) such that the attempted transaction can continue and be completed. In some instances, the positive message may provide details of the executed user-specific analysis, including information about one or more of the user's related accounts or the potential impact. At 354, as noted, the hold state on the transaction placed at 336 can be removed in response to the positive results of the analysis. At 357, the payment detection module can optionally provide a prompt to the user to complete the purchase. In some instances, actions 300 may continue to 360, where the payment information is sent to the appropriate systems so that the transaction or purchase can be completed.

Returning to 348, if the impact of the attempted transaction is determined to be negative and exceeds a threshold for providing negative feedback to the user, actions 300 can continue at 363. At 363, a negative message is created or generated and presented to the user through one or more of the client device's output components (e.g., via the UI, via speakers as audio, etc.). In some instances, the negative message can be presented through a separate channel. For example, if the client device is a smartphone, the negative message can be presented on a smart watch. Alternatively, if the transaction is attempted via a mobile application, a text notification can be sent with the negative message. At 366 the hold state of the transaction can be removed. Removal of the hold state may mean that the multimedia files presented at 339 are stopped, and the presentation regarding the negative impact is presented to the user.

In some instances, regardless of the relative negative impact, actions 300 may continue at 369, where the user is prompted whether to continue or cancel the attempted transaction. The prompt may be a pop-up window, a selectable textual or button-based input, a request for verbal confirmation or cancellation, or any other suitable prompt. In some instances, the prompt may be sent via a separate channel than that which the attempted transaction was executed in, or through a separate device, application, or interaction. In those instances, at 372 a determination is made as to whether the user input is to cancel the transaction or to continue the transaction. If instructions are received to continue, actions 300 continue at 360, where payment information is sent and the transaction is completed. If instructions are received to cancel the transaction, then the payment information is never sent. In some instances, no further information may be sent to the eCommerce site 305, and the transaction can be timed out after a period of time.

Returning to the time the hold state is removed, in some instances a user-specific rule may determine that a particular attempted transaction is associated with a significantly negative financial impact that the attempted transaction is automatically canceled and cannot be pushed through by the user. This may be based on a user-specific rule or by a generic rule related to a particular threshold identified in the financial impact analysis. In such instances, the operations at 375 cause the attempted transaction to be canceled without prompting the user whether to continue or cancel. Upon the determination that the attempted transaction is to be canceled, actions 300 can end and the attempted transaction can be allowed to time out as no payment information is provided to complete the transaction.

Figure 4:
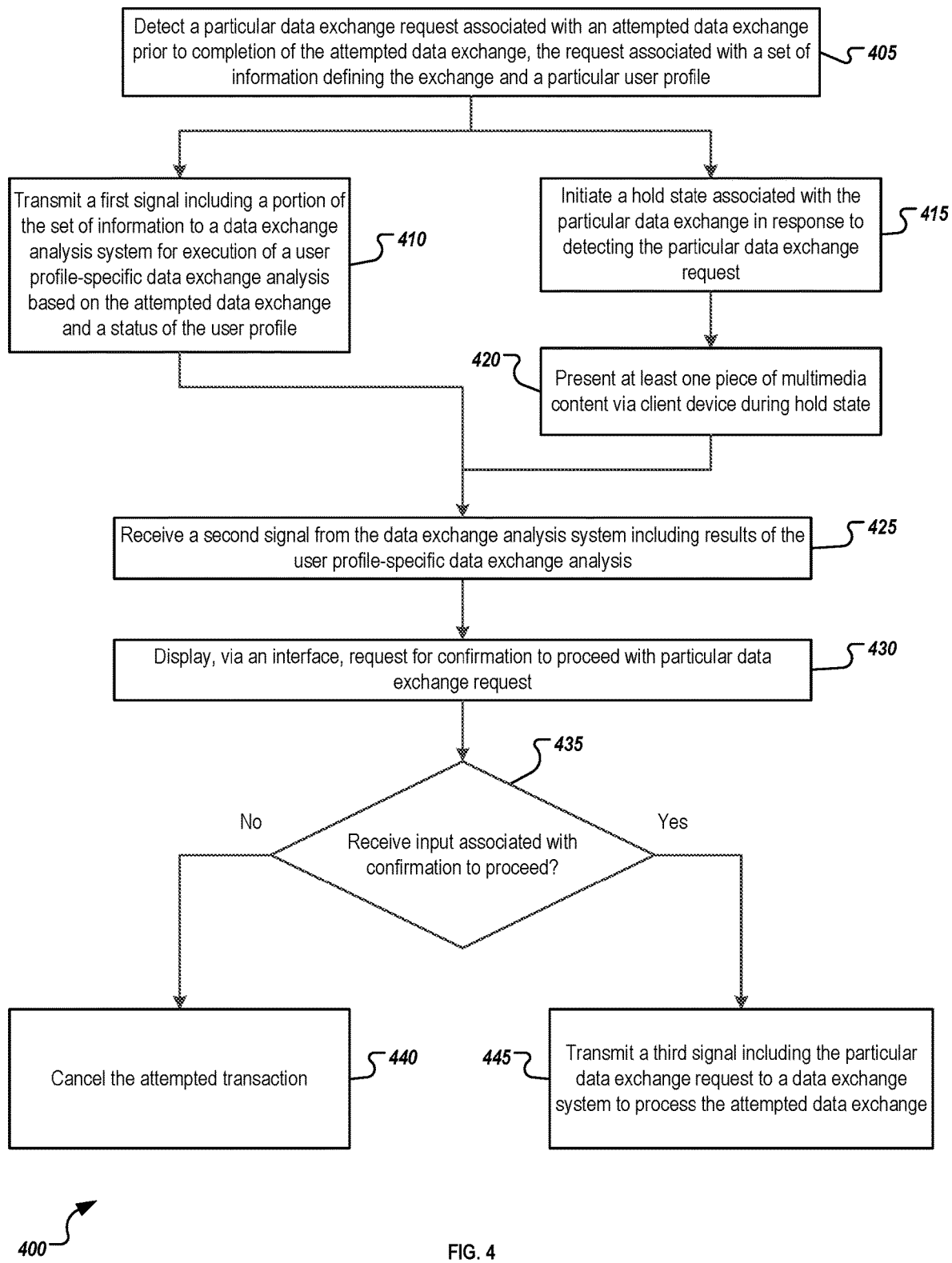
FIG. 4 is a flowchart of an example method performed at a client device in connection with the interception and analysis of a particular data exchange.

FIG. 4 is a flowchart of an example method 400 performed at a client device in connection with the interception and analysis of a particular data exchange. It will be understood that method 400 and related methods may be performed, for example, by any suitable system, environment, software, and hardware, or a combination of systems, environments, software, and hardware, as appropriate. For example, a system comprising a communications module, at least one memory storing instructions and other required data, and at least one hardware processor interoperably coupled to the at least one memory and the communications module can be used to execute method 400. In some implementations, the method 400 and related methods are executed by one or more components of the system 100 described above with respect to FIG. 1, such as the client device 102 and the data exchange analysis system 150, and/or portions thereof.

At 405, a particular data exchange request associated with an attempted data exchange is detected prior to completion of the attempted data exchange. The particular data change request may be executed on a client device, including a mobile device such as a smartphone, where the client device includes a personal assistant or a similar software agent or agents. The data exchange request can be associated with a set of information defining the data exchange, as well as an identification of a user profile corresponding to a particular party or entity in the attempted data exchange. The set of information defining the data exchange may include an amount associated with a particular data exchange where the data exchange relates to a financial transaction, the subject matter of the data exchange, including one or more items or services associated with the data exchange including, in some instances, SKU-level data, the parties to the data exchange, as well as other suitable information describing the attempted data exchange.

In response to the detection, a first signal including at least a portion of the set of information associated with the data exchange is transmitted to a data exchange analysis system at 410, where a user profile-specific data exchange analysis can be executed based on the attempted data exchange and a status of the user profile. The status of the user profile may include information on one or more accounts (e.g., financial or otherwise) associated with the user profile, as well as one or more user profile-specific rules. The user profile-specific rules may be associated with particular financial goals, data exchange rules defined by or associated with the user profile, and any other rule or criteria that can be evaluated for the user. In other instances, one or more general rules may be evaluated for the user profile in light of the attempted data exchange, where the general rules apply to two or more user profiles and are evaluated against detected data exchanges without specific application to a particular user profile. In some instances, the attempted data exchange is evaluated against a history of data exchanges associated with the user profile. In other instances, the attempted data exchange is analyzed in connection with one or more future scheduled or expected but not yet scheduled or performed data exchanges associated with the user profile, such as where a pattern of behavior associated with the user profile is known or derived. By personalizing the analysis, a specific relative or specific impact associated with the user profile can be determined.

At 415, a hold state associated with the particular data exchange is initiated in response to detecting the particular data exchange request. In some instances, the first signal may be transmitted at 410 concurrently with the hold state being initiated. In other instances, the hold state may be initiated in response to a second signal being received from a system or component associated with the data exchange analysis system after the first signal is transmitted. In some instances, a personal assistant executing at the client device may perform or initiate the operations of both 410 and 415, and can do so concurrently or in immediate or quick succession. In any event, the initiation of the hold state at 415 can be performed prior to the attempted data exchange being completed. In some instances, the hold state may be associated with a predefined period of time, where the attempted data exchange is held for that predefined period of time. In some instances, at least one piece of multimedia content can be presented via the client device during the hold state at 420. The multimedia content may be stored locally at the client device or may be streamed or downloaded from a remote source and presented during the hold state. In some instances, the multimedia content may be a music or audio file, an image file, a video file, an interactive game, or an advertisement. Any suitable multimedia content can be presented, and can be presented via any suitable output component of the client device, including a GUI, one or more speakers, or any other suitable output.

At 425, a second signal from the data exchange analysis system or a related component is received at the client device, where the second signal includes results of the user profile-specific data exchange analysis. The results of the analysis can indicate that the attempted data exchange is relatively positive or negative for the user profile. In some instances, the analysis may be a financial analysis determining whether the attempted data exchange will have a relatively positive, neutral, or negative impact on the user profile (e.g., one or more accounts associated with the user profile). In response to receiving the second signal and the results of the analysis, at 430, a request for confirmation to proceed with the attempted data exchange and the particular data exchange request can be displayed or otherwise presented or provided to the user of the client device. In some instances, a textual or visual display associated with the results of the analysis can be provided via a display or user interface, while in other instances a verbal or audible presentation of the results can be provided. The request for confirmation to proceed can include any suitable prompt to the user, including a prompt for touch input, a prompt for verbal input, or a prompt for any other suitable input that can be associated with a confirmation to proceed or an indication of cancellation of the attempted data exchange.

At 435 a determination is made as to whether input associated with a confirmation to proceed is received. If not, and an indication is made to cancel the attempted data exchange or no input is received after a certain period of time, method 400 can continue at 440 where the attempted transaction is canceled. In some instances, an explicit cancellation is performed to cancel the attempted transaction, while in others, no further action is taken with the attempted data exchange and the particular data exchange request to allow the attempted data exchange to time out.

Returning to 435, if a determination is made that input associated with the confirmation to proceed is received, then method 400 continues at 445. At 445, a third signal including the particular data exchange request can be transmitted to the data exchange system associated with the attempted data exchange such that the attempted data exchange is performed and completed.

In some instances, a browser plugin or agent executing on the client device can perform at least the operation of detecting the particular data exchange request and the attempted data exchange. In some instances, the client device may comprise a mobile device, where a mobile application executing on the mobile device performs at least the operation of detecting the particular data exchange.

In some instances, the particular data exchange request may be a transaction request, where the attempted data exchange comprises an attempted purchase transaction. The data exchange analysis system may comprise a financial system and/or a financial analysis system, where the user profile-specific data exchange analysis comprises a financial analytical analysis of the particular user profile based on the transaction request. The analysis may include a comparison or evaluation of the attempted purchase transaction against at least one financial rule specific to the particular user profile.

In some instances, the hold state, once initiated, may be held or maintained for a particular period of time, even where the results of the data exchange analysis are returned or available prior to the expiration of that particular period of time. Further, in some instances, the request for confirmation to proceed with the particular data exchange can be presented during the maintained hold state, wherein the hold state is completed or otherwise ended in response to receiving user input associated with the confirmation to proceed or with user input to cancel the attempted data exchange.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A client device comprising:
a display;
a communications module;
at least one memory storing instructions; and
at least one hardware processor interoperable coupled with the at least one memory, the display, and the communications module, wherein the instructions instruct the at least one hardware processor to:
detect an attempted purchase transaction initiated from the client device to an eCommerce website, wherein detection occurs prior to completion of the attempted purchase transaction, the attempted purchase transaction including a set of information defining the attempted purchase transaction, and the attempted purchase transaction is associated with a particular user profile;
transmit, via the communications module, a first signal including at least a portion of the set of information defining the attempted purchase transaction to an analysis financial system for execution of a financial analytical analysis of the particular user profile based on the attempted purchase transaction, the set of information defining the attempted purchase transaction, and a status of the particular user profile, the financial analytical analysis comprising a comparison of potential impact with one or more negative thresholds;
initiate, by a delay process executing on the client device and prior to the attempted purchase transaction being transmitted to the eCommerce website, a hold state associated with the attempted purchase transaction, wherein the hold state initiated in response to detecting the attempted purchase transaction at the client device, the hold state is maintained for at least a period of time until after a result associated with the financial analytical analysis of the particular user profile based on the attempted purchase transaction and user profile-specific analysis is received;
receive, via the communications module, a second signal including a result associated with the financial analytical analysis of the particular user profile based on the attempted purchase transaction and the user profile-specific analysis;
in response to receiving the result, present, on the display and in an interface, a request for confirmation of whether to proceed with the attempted purchase transaction; and
in response to receiving user input associated with a cancellation of the attempted purchase transaction or in response to receiving no user input associated with the confirmation of the attempted purchase transaction after a predetermined period of time, cancel the attempted purchase transaction.

2. The client device of claim 1, wherein a browser plugin or agent executing on the client device performs the detection of the attempted purchase transaction.

3. The client device of claim 1, wherein the client device comprises a mobile client device, and wherein a mobile application executing on the mobile client device performs the detection of the attempted purchase transaction.

4. The client device of claim 1, wherein the set of information defining the attempted purchase transaction includes at least one of an amount of the attempted purchase transaction, a merchant type associated with the attempted purchase transaction, and a set of SKU-level data associated with at least one item included in the attempted purchase transaction.

5. The client device of claim 1, wherein the hold state is initiated concurrently with transmission of the first signal.

6. The client device of claim 1, wherein initiating the hold state comprises providing for presentation at least one multimedia presentation on a user interface associated with the client device.

7. The client device of claim 6, wherein the at least one multimedia presentation includes at least one of a music file, a video file, an interactive game, an advertisement, a biofeedback file, or an odor file.

8. The client device of claim 1, wherein the financial analytical analysis comprises an analysis of the attempted purchase transaction in a context of the particular user profile, and wherein the analysis financial system is separate from the eCommerce website and the client device.

9. The client device of claim 8, wherein the financial analytical analysis comprises a comparison of the attempted purchase transaction against at least one financial rule specific to the particular user profile.

10. The client device of claim 9, wherein at least one of the financial rules comprises a rule identifying a particular amount of spending over a period of time associated with the particular user profile and an effect on the particular amount of spending associated with the attempted purchase transaction.

11. The client device of claim 1, wherein the attempted purchase transaction is automatically canceled in response to a determination that the attempted purchase transaction is associated with a negative financial impact above a predetermined threshold.

12. The client device of claim 1, wherein the hold state is maintained after receiving the second signal including the result associated with the financial analytical analysis of the particular user profile based on the attempted purchase transaction and the user profile-specific analysis.

13. The client device of claim 12, wherein the request for confirmation of whether to proceed with the attempted purchase transaction is presented during the hold state, and wherein the hold state is completed in response to receiving user input associated with the request for confirmation.

14. The client device of claim 1, wherein initiating the hold state associated with the attempted purchase transaction comprises:
  receiving, via the communications module, a fourth signal including instructions to initiate the hold state from the analysis financial system, where the fourth signal is received after transmission of the first signal; and
  in response to receiving the fourth signal, initiating the hold state.

15. A non-transitory, computer-readable medium storing computer-readable instructions executable by a computer and configured to:
  detect an attempted purchase transaction initiated from a client device to an eCommerce website, wherein detection occurs prior to completion of the attempted purchase transaction, the attempted purchase transaction including a set of information defining the attempted purchase transaction, and the attempted purchase transaction is associated with a particular user profile;
  transmit, via a communications module, a first signal including at least a portion of the set of information defining the attempted purchase transaction to an analysis financial system for execution of a financial analytical analysis of the particular user profile based on the attempted purchase transaction, the set of information defining the attempted purchase transaction, and a status of the particular user profile;
  initiate, by a delay process executing on the client device and prior to the attempted purchase transaction being transmitted to the eCommerce website, a hold state associated with the attempted purchase transaction, the hold state initiated in response to detecting the attempted purchase transaction at the client device, wherein the hold state is maintained for at least a period of time until after a result associated with the financial analytical analysis of the particular user profile based on the attempted purchase transaction and user profile-specific analysis is received;
  receive, via the communications module, a second signal including a result associated with the financial analytical analysis of the particular user profile based on the attempted purchase transaction and the user profile-specific analysis, wherein the attempted purchase transaction is automatically canceled in response to a determination that the attempted purchase transaction is associated with a negative financial impact above a predetermined threshold;
  in response to receiving the result, present, on a display and in an interface, a request for confirmation of whether to proceed with the attempted purchase transaction; and
  in response to receiving user input associated with a cancellation of the attempted purchase transaction or in response to receiving no user input associated with the confirmation of the attempted purchase transaction after a predetermined period of time, cancel the attempted purchase transaction.

16. The computer-readable medium of claim 15, wherein the financial analytical analysis comprises a comparison of potential impact with one or more negative thresholds.

17. The computer-readable medium of claim 15, wherein initiating the hold state comprises providing for presentation at least one multimedia presentation on a user interface associated a client device executing the computer-readable instructions.

18. A computerized method performed by one or more processors, the method comprising:
  detecting an attempted purchase transaction initiated from a client device to an eCommerce website, wherein detection occurs prior to completion of the attempted purchase transaction, the attempted purchase transaction including a set of information defining the attempted purchase transaction, and the attempted purchase transaction is associated with a particular user profile;
  transmitting, via a communications module, a first signal including at least a portion of the set of information defining the attempted purchase transaction to an analysis financial system for execution of a financial analytical analysis of the particular user profile based on the attempted purchase transaction, the set of information defining the attempted purchase transaction, and a status of the particular user profile, the financial analytical analysis comprising a comparison of potential impact with one or more negative thresholds;

initiating, by a delay process executing on the client device and prior to the attempted purchase transaction being transmitted to the eCommerce website, a hold state associated with the attempted purchase transaction, the hold state initiated in response to detecting the attempted purchase transaction at the client device, wherein the hold state is maintained for at least a period of time until after a result associated with the financial analytical analysis of the particular user profile based on the attempted purchase transaction and user profile-specific analysis is received;

receiving, via the communications module, a second signal including a result associated with the financial analytical analysis of the particular user profile based on the attempted purchase transaction and the user profile-specific analysis;

in response to receiving the result, displaying on an interface a request for confirmation of whether to proceed with the attempted purchase transaction; and in response to receiving user input associated with a cancellation of the attempted purchase transaction or in response to receiving no user input associated with the confirmation of the attempted purchase transaction after a predetermined period of time, cancelling the attempted purchase transaction.

19. The method of claim 18, wherein the attempted purchase transaction is automatically canceled in response to a determination that the attempted purchase transaction is associated with a negative financial impact above a predetermined threshold.

* * * * *